Oct. 1, 1963
B. F. HARRIS ETAL
3,105,365
AIR CONDITIONING CONTROL
Filed Sept. 20, 1962
2 Sheets-Sheet 1
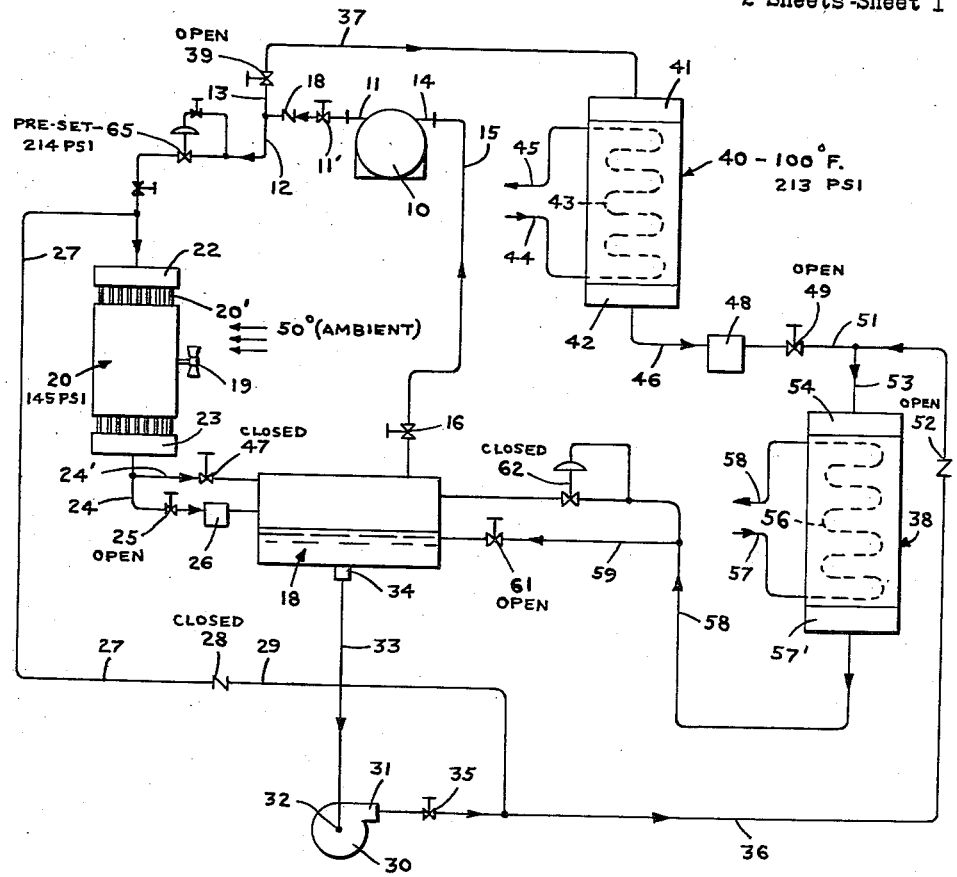
FIG. 1  COOLING WITH AUXILIARY HEATING
BRADFORD F. HARRIS
FREDERIC A. MacCONNELL
INVENTORS
BY Daniel H. Bobis
Atty.

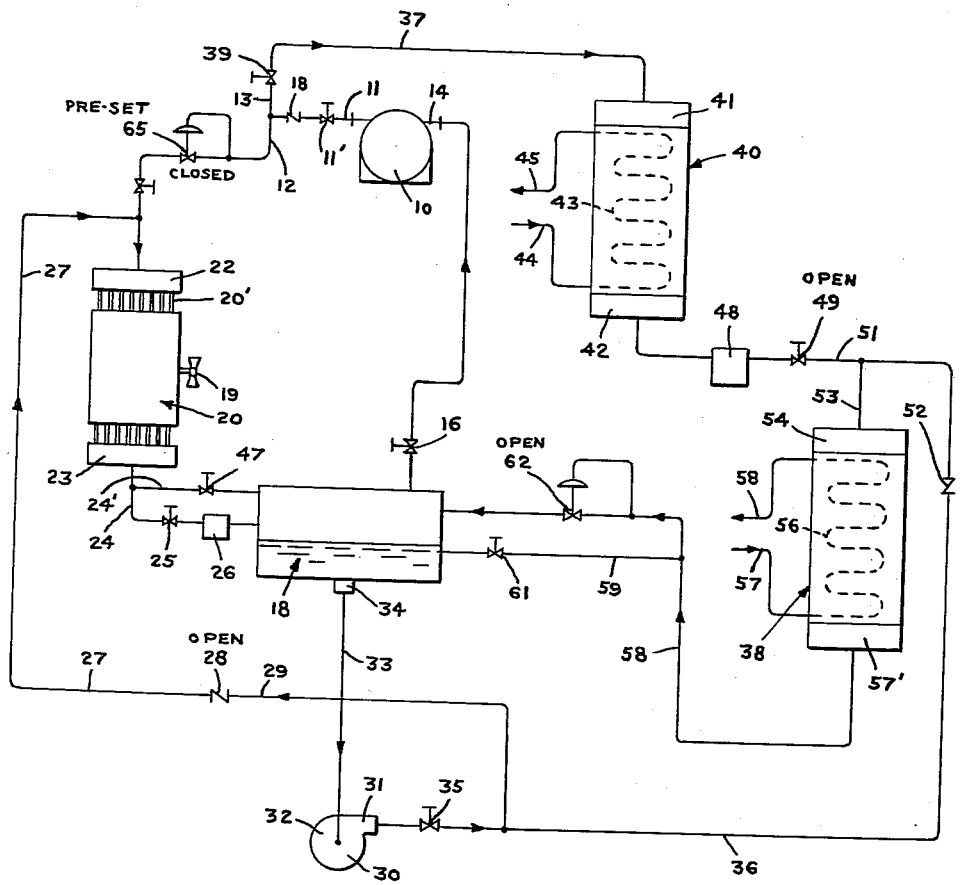
FIG. 2. HEATING CYCLE
BRADFORD F. HARRIS
FREDERIC A. MAC CONNELL
INVENTORS //patents.uspto.gov headers omitted//

United States Patent Office 3,105,365
Patented Oct. 1, 1963

3,105,365
AIR CONDITIONING CONTROL
Bradford F. Harris, Murray Hill, and Frederic A. MacConnell, Somerville, N.J., assignors to Worthington Corporation, Harrison, N.J., a corporation of Delaware
Filed Sept. 20, 1962, Ser. No. 224,940
10 Claims. (Cl. 62—159)

This invention relates in general to an air conditioning system control. It relates more particularly to an automatic control for a self balancing system adapted to provide simultaneous heating and cooling to discrete portions of a conditioned area.

Multi unit and similar installations such as apartment houses, laboratories, department stores, office buildings and schools are so designated according to present standards as to require a highly sophisticated air conditioning heating and cooling system.

In any versatile air conditioning system it is not sufficient to merely provide cooling in the summer and heating in the winter. To be at all practical the system must embody both stated functions and be adapted to afford complete air conditioning at various parts of the building in accordance with diverse thermo requirements. For example, during the summer season, any air conditioning system must be sufficiently flexible in operation to provide a normal cooling atmosphere in warmer parts of the building while at the same time providing necessary heating for other parts of the building. Similarly, in the winter, building outer walls will be colder than those nearer the center and will require heating as contrasted with the center areas which may require a degree of cooling.

The present air conditionnig control is particularly adapted for use in systems simultaneously operable on two cycles; one cycle is for heating, and one for cooling portions of the enclosed area such as the various parts of the building. An example of such a system is the multi-cycle heat pump arrangement disclosed in presently pending application entitled Multi Cycle Heat Pump, Serial Number 181,594, filed March 22, 1962 by R. E. Japhet, now Patent No. 3,078,689.

While the following description will be directed to the control means as employed in a heat pump cycle, it is understood that the novel distribution and arrangement of components may also be used in other air conditioning systems in which a difference in pressure between cooperatively connected heat exchanger components determines at least in part the flow rate of refrigerant to the respective components.

In any system of the type described, a desirable characteristic is that the unit be self balancing, that is, inherently the system should adjust its output capacity automatically to any particular loading situation. One means by which such a balancing adjustment is made is by operating the system in conjunction with a sink media which may either absorb from, or supply thermal energy to the system. By proportioning simultaneous fluid flow through the various branches of the system, the relatively constant temperature sink media provides a means for establishing thermal equilibrium under varying load conditions.

It is therefore a primary object of the invention to provide an air conditioning system including a means for automatically controlling the distribution of refrigerant in accordance with the load conditions.

A further object is to provide an air conditioning system having heat exchange means in association with a sink media, and control means adapted to proportion the flow of refrigerant through the system and to the sink media in accordance with the cooling load.

A still further object is to provide a self balancing air conditioning system adapted to simultaneously heat and cool portions of an enclosed area and further adapted to automatically adjust operation of the system to maintain a condition of substantially stable thermal equilibrium to balance the overall heating and cooling load imposed thereon.

Other objects of the invention will become clear to those skilled in the art from the following description and claims taken in view of the accompanying drawings in which:

FIGURE 1 is a diagrammatic sketch of the disclosed control arrangement as embodied in a heat pump system for providing simultaneous heating and cooling to an enclosed area.

FIGURE 2 is a diagrammatic sketch showing the system of FIGURE 1 set for winter operation on the heating cycle.

The invention in brief contemplates an improved air conditioning system circulating a vaporizable liquid refrigerant and including means to automatically distribute flow of refrigerant to various portions of the system for the purpose of maintaining a status of thermal equilibrium. To demonstrate the features and operation of the control means, the following description is made in conjunction with the heat pump arrangement disclosed in the above identified patent application entitled Multi Cycle Heat Pump, Serial Number 181,594. It is again emphasized though that defining the invention in terms of the instant heat pump does not constitute a limitation of the scope to which the control means may be applied but rather serves to illustrate the novel arrangement.

The subject heat pump is particularly adapted to provide simultaneous heating and cooling to areas of a conditioned enclosure. The present control system is assimilated into the heat pump arrangement to function as a refrigerant flow distribution means particularly when the cycle is on the cooling phase, that is when the primary function of the heat pump is to provide cooling to a specified area with an auxiliary amount of heat being simultaneously supplied to the same area.

A portion of the heat pump is usually disposed indoors for conditioning an enclosure and comprises a plurality of heat exchange means connected in circuit arrangement for circulating either liquid and/or vaporous refrigerant. This indoor arrangement is such that at least one of said heat exchange means functions in the capacity of a condenser. Thus, compressed vaporous refrigerant delivered to the said heat exchanger is condensed, yielding heat to the atmosphere or other transfer media.

Second heat exchange means arranged in the circuit and connected downstream of the first mentioned heat exchange means, functions as an evaporator and normally receives a flow of refrigerant, generally in liquid state, from the condenser portion. Pumping means connected to both indoor and outdoor circuits is also arranged to selectively and interchangeably introduce cold liquid refrigerant thereto.

To maintain a condition of thermal equilibrium in the overall arrangement, the heat pump further includes heat exchange means positioned out of doors or in heat exchange contact with the sink media. The latter metioned heat exchanger is interconnected to and cooperative with the indoor portion of the system such that the outdoor units may either give up heat to or extract heat from the sink media in accordance with the conditioning load imposed on the indoor portion.

A common accumulator is connected to both indoor and outdoor cycles downstream of the respective heat exchangers to receive flows of vaporous and liquid refrigerant. Compressor means is communicated with the accumulator to receive vaporous refrigerant and to introduce the same under pressure to the upstream side of the respective indoor and outdoor condensers as required. Pumping means also connected to the accumulator receives a flow of liquid refrigerant which is circulated to the evaporator in the indoor cycle.

Operation of the heat pump is such as to be adapted for either winter or summer service. That is, proper adjustment of flow control valves will permit the compressor and pump means to deliver vaporous and liquid refrigerant to either the indoor or outdoor portions of the system depending on the type and degree of conditioning required at the load zone.

To facilitate describing the invention, the term thermal equilibrium is herein used to designate a balanced operating status of the system. Notably, the thermal units required to properly condition the building or enclosure by simultaneous heating and cooling of discrete portions thereof, could conceivably be entirely balanced within the indoor cycle. Such a condition however as a matter of practicality is virtually impossible to attain. Consequently, the outdoor portion of the arrangement will correct any imbalance existing in the system due to the conditioning load. In referring to thermal equilibrium, it is not to be inferred that the system thermally balances such heat losses as those due to friction or electrical power requirements but only those losses confined to the heat pump itself. It should be noted in addition, that the heat transfer means at both indoor and outdoor heat exchangers may constitute any of several embodiments presently in commercial use. For example, depending on other factors peculiar to the particular application, the respective heat exchangers may be of the water to refrigerant, or air to refrigerant type as best serves the immediate need.

One portion of the system hereinafter described will be generally referred to as the outdoor cycle since the principal element, that is the heat exchanger in this portion is positioned in heat exchange contact with outdoor air or the surrounding atmosphere. Alternatively, this element may be positioned in contact with other heat sink media such as a well, a large body of water or even an underground piping system. In either event it is to be understood that the primary function of this portion of this system is to provide the necessary make up to correct thermal imbalance to the system by either absorbing or rejecting heat in accordance with the load requirements imposed by the indoor portion.

The presently disclosed control means is useful when the described system is adjusted to operate on an essentially cooling cycle wherein the major portion of the system load results from cooling of the interior or enclosure, with a minimum amount of auxiliary heating being furnished. Under such conditions, most of the indoor air conditioning will be provided through the evaporator heat exchanger which receives refrigerant from both the indoor positioned condenser and from the liquid circulating pump. To thermally balance the system, the major portion of compressed gas leaving the compressor discharge will be directed to the outdoor heat exchanger, a small portion of this gaseous fluid is directed to the indoor condenser to provide the auxiliary heating.

Referring to the drawings, FIGURE 1 illustrates the control system embodied in a heat pump of the type described for providing simultaneous cooling and heating to an indoor room or building and for selectively and interchangeably delivering proportioned flows of refrigerant to heat exchangers in the system in accordance with the load thereon.

The heat pump circuit, and in particular the portion cooperative with the sink media, consists of a compressor 10 having an outlet or discharge 11 connected through a service valve 11' and check valve 18 to branch lines 12 and 13 including flow control means to be hereinafter described. The suction side of compressor 10 is provided with an inlet 14 which connects through conduit 15 and service valve 16 to the upper vapor section of an accumulator 18. Flow control means downstream of compressor 10 includes a valve such as a solenoid operated valve 39 for controlling flow of hot compressed refrigerant to the indoor circuit. Also provided downstream of compressor 10 is the presently disclosed control means for selectively directing proportioned flows of hot vaporous refrigerant from compressor 10 to the indoor and outdoor cycles.

Outdoor heat exchanger 20 as mentioned is disposed to contact the sink media or source which, for the purpose of the present invention will be described as being the atmosphere. A fan 19 or other embodiment of inductor forces air across the coils of the heat exchanger 20 for the purpose of balancing in the system the amount of heat absorbed by the indoor cycle during the cooling process.

Heat exchanger 20 as noted from the foregoing is of the tube type including a refrigerant circulating tube bundle 20' connected to inlet and outlet headers 22 and 23 respectively.

The downstream of outlet header 23 is connected through line 24 and valve 25 to the inlet of a high pressure flow regulator 26 which receives and stores liquid refrigerant in a float chamber. The outlet side of regulator 26 is connected to accumulator 18 for holding liquid and vaporous refrigerant prior to circulation through the system. Flow regulator 26 is of a type familiar in the trade and commercially available for the stated purpose in which a fluid in both liquid and vaporous form are stored and metered from the regulator float chamber through a liquid level responsive valve. A bypass line 24' including a valve 47 permits direct flow from header 23 into accumulator 18 when the cycle is adjusted for winter operation.

Refrigerant compressor 10, outdoor heat exchanger 20, accumulator 18 and flow regulator 26 connected as described, define a closed cycle which will be hereinafter referred to as the high pressure side of the heat pump. An integral part of the system is the liquid refrigerant pumping circuit. This consists primarily of a pump 30 having its suction 32 connected to the liquid outlet 34 of the accumulator 18 through line 33 to receive a flow of liquid refrigerant. The pump is of the type normally associated with air conditioning refrigerant fluid pumping means.

Pump 30 as shown is arranged to discharge a unidirectional flow of liquid refrigerant to indoor heat exchanger 38 through line 36, valve 35 and check valve 52. Heat exchanger 38 operates in the cycle solely as an evaporator and functions as a chiller or cooling element.

The indoor portion of the system receives hot compressed vaporous refrigerant through line 37 communicated by way of solenoid valve 39 with compressor discharge 11. When valve 39 is in the open position, hot compressed refrigerant normally flows through the line 13 communicating the downstream side of said valve to the upstream side or inlet header 41 of heat exchanger 40. This heat exchanger is associated with a hot loop or a hot deck within the enclosure for providing the above mentioned auxiliary heating to the normally cooled portion of the room or enclosure.

As illustrated, heat exchanger 40 is generally of the type in which an inlet header 41 and outlet header 42 are connected by a fluid conducting tube bundle therebetween. Coil 43 having inlet and outlet 44 and 45 respectively is connected to a source of heat transfer media such as water which may constitute a part of the aforementioned hot deck or hot loop. Tube and shell heat exchangers of this general type are well known in the air conditioning and refrigeration art and require no further mention of structural details. Heated water circulating through coil 43 leaves by way of outlet 45 and is thence conducted as needed to provide the required heating to discrete portions of the conditioned part of the building or enclosure. The hot loop heat exchanger 40 insofar as the refrigerant circuit functions, acts singularly in the capacity of a condenser. Specifically, hot vaporized compressed refrigerant in passing through heat exchanger 40 enters outlet header 41 and in circulating, transfers heat to the cooling water condensing the refrigerant vapor. Thus refrigerant will be condensed or substantially condensed in the indoor heat exchanger 40 and passes through line 46 into a second high pressure flow regulator 48 positioned downstream of discharge header 42.

Regulator 48 is of a type similar to the previously described regulator 26 as employed in the present manner. When liquid refrigerant from condenser 40 accumulates in the regulator high pressure float chamber, it is metered out to evaporator 38 through a float controlled valve.

From the outlet side of high pressure float regulator 48, flashed liquid and vaporous refrigerant is passed through a valve 49 which communicates by way of lines 51 and 53 to the inlet header 54 of evaporating heat exchanger 38. This heat exchanger may be similar in construction to the shell and tube previously described with respect to condenser 40. In brief, heat exchanger 38 comprises a coil 56 provided with water inlet and outlet 57 and 58 respectively. Coil 56 defines the cold loop of the circuit which may be communicated to the cold duct portion of an air conditioning system or directed to a cold deck for cooling purposes.

Operationally, liquid refrigerant in passing through evaporator 38 extracts heat from the circulating water in the cold loop, passes through outlet header 57' and thence to line 58 for conduction to accumulator 18. Conduit 59 communicates with the upstream side of valve 61 controlling flow from the indoor heat exchanger either directly during the cooling cycle or through a back pressure regulator 62 during a heating cycle, prior to returning refrigerant to accumulator 18.

OPERATION

(Cooling Cycle) FIG. 1

In normal cooling cycle operation, indoor condenser 40 is preadjusted to function at a desired head pressure and to meter a desired amount of refrigerant to achieve a certain degree of heating indoors. Heat is thus extracted from the hot vaporous refrigerant provided by compressor 10. The normal operating head pressure of indoor condenser 40 will be dependent on the deck temperature or temperature to be maintained to achieve a given condition. For example, in order to function at a temperature of above 100° F., the condenser 40 operating pressure for a particular refrigerant, will be about 213 p.s.i.

Under these circumstances, outdoor heat exchanger 20 may operate at a lower pressure than the pressure on the indoor condenser. By way of example, for an outdoor ambient of about 50° F., the outdoor condenser operating pressure will be about 145 p.s.i. Thus, since the inlet of both indoor and outdoor condensers are mutually connected to compressor outlet 11, the flow of hot refrigerant gas would ordinarily gravitate to the lower pressure outdoor portion of the system. This of course would result in a deficiency of the refrigerant to the high pressure indoor condenser which will in turn be rendered relatively ineffectual.

In order to correct this imbalance of refrigerant flow to respective indoor and outdoor condensers, the presently disclosed control means is interposed downstream of the compressor discharge 11. The control means functions to provide indoor condenser 40 with the required amount of hot vaporous refrigerant to maintain a desired operating condition, passing the remainder of said fluid to the outdoor portion of the system.

A preferred embodiment of the control means as shown in the diagram consists of a preset, automatically adjustable flow regulator valve 65 particularly of the back pressure type which includes means for varying fluid flow through the valve above a predetermined pressure in response to pressure on the inlet side. Thus, with an upstream pressure in line 12 less than the preset opening pressure on back pressure regulator 65, there will be no flow of vaporous refrigerant from compressor 10 to outdoor condenser 20. The entire refrigerant flow will be directed through valve 39 to the indoor portion of the cycle, that is to the series connected condenser 40 and evaporator 38. As operating requirements of indoor condenser 40 are satisfied, fluid pressure in line 37 will gradually build up to the required 213 p.s.i. to provide the desired normal deck temperature. An excessive amount of refrigerant delivered to indoor condenser 40 will result in an increase of the stated normal operating pressure above the desired 213 p.s.i.

To alleviate this pressure rise at condenser 40, and to maintain a proper temeprature status, back pressure regulator 65 is preset to automatically open and pass vaporous refrigerant at and above the indoor condenser pressure of 213 p.s.i. Thus, in the instant situation, back pressure regulator 65 will be set to admit vaporous refrigerant at pressures of above about 214 or 215 p.s.i. Refrigerant passing through the regulator will enter outdoor condenser 20 in heat exchange contact with the sink media and subsequently be redirected to accumulator 18 for recirculation through the system.

To follow the stated conditions, at an ambient temperature of about 50° F., operating pressure of heat exchanger 20 functioning in a condensing capacity will be about 145 p.s.i.

As the load at the hot deck 40 increases, or the quantity of hot vaporous refrigerant circulated becomes insufficient to satisfy heating needs at said indoor condenser 40, an increased rate of condensation will result in a pressure drop at the indoor condenser. When this pressure falls below the preset pressure of back pressure regulator 65 (214 p.s.i.), the latter will throttle vapor flow to the outdoor portion of the system, thus directing additional flow from compressor 10 to line 37 rather than through the back pressure regulator and to outdoor coil 20.

As previously mentioned, heat exchanger 38 will ordinarily function in the capacity of an evaporator when the system operates on a cooling cycle. Liquid refrigerant is directed to inlet header 54 from two sources. Again referring to the figure, evaporator 38 receives a first flow of refrigerant usually in both liquid and vapor phase from outlet header 42 of condenser 40 by way of high pressure regulator 48 and valve 49.

A second and major flow to evaporator 38 is received from the liquid refrigerant pump 30, through line 36 and valve 35 and check valve 57 respectively interposed therein. Under highly improbable and unusual circumstances, the rate of heat exchange at condenser 40 will approximately equal the rate at evaporator 38 thereby in effect substantially balancing the system in terms of thermal units exchanged. Normally however, the indoor portion of the system will be thermally in a state of imbalance. This imbalance is compensated for in the present system by the function of the outdoor cycle cooperative with the heat sink media. The cycle is completed by flowing refrigerant to the accumulator by way of line 59 and valve 61.

(Heating Cycle) FIG. 2

As herein suggested, control means operates primarily when the heat pump is on the cooling cycle. However, the control as shown may be embodied in the overall heat pump arrangement which also functions to primarily produce heat rather than to effect cooling. Referring to the figure, when the system is adjusted to heat the enclosed or indoor portion, while simultaneously cooling portions thereof, refrigerant will be circulated through the system as follows.

Outdoor heat exchanger 20 will again operate to thermally balance the system but not in the capacity of a condenser, rather as an evaporator. The entire flow of liquid refrigerant is delivered from pump discharge 31 through line 29, check valve 28, and line 27 to the downstream side of closed regulator 65. Thus, referigerant flow in effect is blocked by regulator 65 and flows directly to inlet header 22 of heat exchanger 20.

After heat exchanging with the sink media, refrigerant is circulated through the remainder of the outdoor circuit through open valve 25 and float regulator 26 to accumulator 18.

Simultaneously, the system indoor portion receives the entire flow of vaporous refrigerant from compressor 10 which is conducted through conduit 13, valve 39 and line 37 to condenser 40. Condensate is then carried to float regulator 48 and into the inlet header 54 of indoor evaporator 38. To complete the indoor cycle, referigerant is conducted from the evaporator to common accumulator 18 through back pressure regulator 62.

Although the control arrangement at regulator 65 exercises a minimum degree of fluid control when on the winter or heating cycle, it does serve the additional function of defrosting the system. For example, when the outdoor evaporating temperature is below freezing, causing frost formation on the outdoor heat exchanger, regulator 65 may be automatically opened intermittently to direct hot vaporous refrigerant therethrough. During the defrost period, refrigerant flow from pump 30 to heat exchanger 20 is temporarily interrupted and valve 39 is closed. The defrost continues until the outdoor unit is free of frost and in condition to again operate satisfactorily.

Defrosting through the back pressure regulator rather than through ordinary valving is further advantageous due to elimination of the undesirable modulating effect normally experienced during this phase of operation.

It is readily seen that the present system embodies many desirable characteristics not heretofore found in air conditioning equipment. Not only will the entire arrangement be self balancing on the cooling cycle in conformance with the indoor load imposed thereon, but the heating portion of the indoor load will always be adequately and automatically maintained. Further, although we have described the novel regulating means as maintaining a preset pressure upstream of the back pressure regulator 65, it is understood that the desired control may similarly be achieved by means familiar in the art.

For example, hot gaseous flow from the compressor to the indoor or outdoor portion may be governed by use of suitable sensing means disposed in the circuit to determine conditions at a point where the cooling or heating load is reflected. One such means consists of temperature sensing means at the hot deck water line, connected to vary gaseous flow through regulator 65 as the load adjusts.

In switching the respective valve settings for different seasonal operation, the valves are preferably automatically adjustable to both alter the flow of liquid and gas through the circuit and to vary the flow. The latter is generally achieved by the usual facility of unloading the compressor at light loads. For alternating between summer and winter operation, however, the entire valve service including valves 18, 25, 35, 47, 61, 39 and 49, together with regulators 62 and 65 may be electrically actuated by sensing means adapted to ascertain the load condition and to adjust refrigerant flow accordingly.

The control system of necessity governs the entire circuit arrangement and coordinates the valve settings to assure proper flow. This is especially important since flow through the circuit parts is dependent on predetermined pressure within said parts.

Again it is suggested that while we have described the invention with particular reference to a heat pump arrangement for providing simultaneous heating and cooling, it is understood that the control system may be used as well in other refrigeration systems employing elements at different operating pressure, by one skilled in the art without departing from the spirit and scope of the invention.

What is claimed is:

1. In a self balancing air conditioning system having an indoor cycle operable to provide simultaneous heating and cooling, and an outdoor cycle disposed to contact a sink media for maintaining thermal equilibrium in said system in accordance with the load imposed on the indoor cycle:
    (a) said indoor cycle having a first and second heat exchanger means serially connected to circulate refrigerant in vaporous and liquid state to simultaneously provide said heating and cooling,
    (b) the outdoor cycle including a third heat exchanger means arranged to circulate refrigerant in contact with a sink media,
    (c) an accumulator connected to the downstream side of the respective second and third heat exchanger means respectively receiving flows of liquid and vaporous refrigerant therefrom,
    (d) a compressor having a suction inlet connected to the accumulator to receive vaporous refrigerant and to deliver hot compressed refrigerant gas to the upstream side of said first and third heat exchanger means respectively,
    (e) flow control means communicating said first and third heat exchanger means with the compressor discharge and being automatically adjustable to vary fluid flow to said third heat exchanger to maintain a predetermined operating head pressure in said first heat exchanger means,
    (f) and pump means having its suction connected to said accumulator and having the discharge outlet connected to the respective inlets of said second and third heat exchanger means respectively for selectively delivering liquid refrigerant to said latter mentioned heat exchanger means when not connected to receive hot vaporous refrigerant.

2. In a self balancing air conditioning system substantially as defined in claim 1 wherein; the flow control means communicating said first and third heat exchanger means with the compressor discharge includes:
    (a) a back pressure regulator having an inlet and outlet,
    (b) said inlet being communicated with the compressor discharge and to the upstream side of the first heat exchanger means,
    (c) said outlet being communicated to the upstream side of the third heat exchanger means,
    (d) said back pressure regulator being operable to increase refrigerant flow to the third heat exchanger means contacting a sink media in an amount proportional to the pressure in excess of the normal operating pressure at said first heat exchanger means.

3. In a self balancing air conditioning system substantially as defined in claim 2 wherein:
    (a) flow control means communicating said first and third heat exchanger means with the compressor discharge and with the back pressure regulator includes an inlet, outlet, and a pressure tap to vary fluid flow through the regulator,
    (b) said inlet being communicated with the compressor discharge and to the upstream side of the first heat exchanger means,
    (c) said outlet being communicated to the upstream side of the third heat exchanger means,
    (d) and the pressure tap communicated with said inlet to adjust flow of refrigerant from said compressor to the upstream side of the third heat exchanger means in response to the fluid pressure at said inlet.

4. In a heat pump operable when on the cooling cycle to provide simultaneous heating and cooling components to an indoor load, said heat pump comprising:

(a) a plurality of heat exchanger means, (b) a common accumulator communicated downstream of the heat exchanger means to receive vaporous and liquid refrigerant therefrom, (c) compressor means having its suction connected to said accumulator to receive a flow of vaporous refrigerant, (d) at least one of said plurality of heat exchanger means being positioned in contact with a sink media for maintaining the heat pump in a condition of substantial thermal equilibrium in accordance with the indoor load thereon, the remainder of said heat exchanger means being positioned indoors furnishing components of said simultaneous heating and cooling load, (e) first conduit means communicating the discharge of the compressor with the inlet of heat exchanger means in contact with said sink media and with the inlet of heat exchange means positioned indoors furnishing the heating component to said load, (f) a pump having its suction connected to the accumulator receiving liquid refrigerant therefrom, and connected to selectively deliver compressed liquid refrigerant to the heat exchanger means in contact with a sink media when the latter is not receiving hot vaporous refrigerant and to the upstream side of indoor heat exchanger means furnishing the cooling component of said load, (g) control means associated with said first conduit means to automatically apportion the output flow from said compressor to the respective heat exchanger means in the sink media and to the indoor heat exchanger means furnishing the heating component of said load respectively, in accordance with the degree of heating being furnished at said latter mentioned heat exchanger means.

5. In a heat pump substantially as defined in claim 4 wherein the control means associated with said first conduit means includes:

(a) a first line connecting said compressor discharge with said sink media heat exchanger means, (b) flow regulating means in said first line operable to control the flow of hot compressed refrigerant therethrough, (c) said flow regulating means being automatically operable to increase said refrigerant flow therethrough and to the sink media heat exchanger with an increase in pressure at the downstream side thereof in excess of the operating pressure at the indoor heat exchanger means furnishing the heating component to the load, (d) and a second line connecting said compressor discharge with said indoor heat exchanger means furnishing the heating component to the indoor load.

6. In a heat pump substantially as defined in claim 5 wherein:

(a) the flow regulating means in said first line includes a back pressure regulator operable in response to the pressure at the inlet of said regulator to proportionately increase the flow of refrigerant therethrough responsive to a pressure increase at said inlet.

7. In a heat pump substantially as defined in claim 6 wherein; said pressure regulator is preset to pass vaporous refrigerant flow therethrough at pressures in excess of the normal operating pressure of said indoor heat exchanger means furnishing the heating component to the indoor load.

8. In a self balancing air conditioning system circulating vaporizable refrigerant and operable when on a cooling cycle to simultaneously provide heating and cooling components to an indoor load comprising:

(a) an outdoor cycle including a heat exchanger means having inlet and outlet and positioned in contact with a sink media, (b) an indoor cycle including a condenser and an evaporator being serially connected to define a circuit for furnishing said simultaneous heating and cooling to the indoor load, (c) an accumulator in communication with said respective indoor and outdoor cycles to receive flows of liquid and vaporous refrigerant therefrom, (d) a compressor having its suction connected to the accumulator to receive vaporous refrigerant therefrom and having its discharge communicated to deliver hot compressed vaporous refrigerant to the inlet of said indoor condenser and interchangeably and selectively to the outdor heat exchanger in contact with the sink media, (e) a pump having its suction communicated to the accumulator to receive a flow of liquid refrigerant and having its discharge connected to deliver said refrigerant under pressure to said indoor evaporator and interchangeably and selectively to the outdoor heat exchanger when the latter is not receiving hot compressed vaporous refrigerant, (f) said indoor condenser being preset to normally function on said cooling cycle at a heat pressure in excess of the heat pressure of said outdoor heat exchanger to provide the heating component to said indoor load, (g) control means communicating said compressor discharge with said outdoor heat exchanger to deliver hot compressed refrigerant gas thereto only at pressures in excess of the normal operating pressure in said indoor condenser, (h) said control means including a pressure regulator having an inlet and outlet and being responsive to fluid pressure at the said inlet to vary flow therethrough with a variation in said inlet pressure, (j) said control inlet being communicated with said compressor discharge and with the upstream side of said indoor condenser, (k) said regulator outlet communicated to the upstream side of the outdoor heat exchanger to deliver compressed gaseous refrigerant thereto in an amount in excess of the refrigerant requirement to maintain the normal operating pressure at said indoor condenser.

9. A heat pump system circulating a vaporizable refrigerant in liquid and vapor phase, and having a heat exchange means operable at a predetermined refrigerant pressure forming a first circuit to condition a load area, other heat exchange means forming a second circuit connected to said first circuit and in contact with a sink media to maintain the system in a condition of thermal equilibrium which comprises:

(a) an accumulator communicated with each of said first and second circuits to receive refrigerant in liquid and vapor phase, (b) compressor means having a suction connected to said accumulator to receive vaporous refrigerant, and to discharge a stream of hot compressed refrigerant vapor, (c) conduit means communicating the compressor discharge with said first and second circuits respectively to supply flows of said hot vaporous refrigerant to the heat exchange means in the first and second circuits, (d) flow regulating means interposed in said conduct means and being automatically operable to selectively proportion said flows of vaporous refrigerant to the heat exchange means in said first and second circuits, (e) said flow regulating means being responsive to fluid pressure at the inlet side thereof to adjust flow of refrigerant vapor from the compressor discharge to each of said first and second circuits to maintain the predetermined operating pressure in said first circuit heat exchanger means for conditioning the load area.

10. In an air conditioning system substantially as defined in claim 9 wherein the control means interposed in said conduit means comprises:
(a) a flow regulating means having an inlet in communication with said compressor discharge and having an outlet communicated with said second circuit, directing a variable flow of hot vaporous refrigerant thereto,
(b) other conduit means communicating the compressor discharge with said first circuit,
(c) said flow regulating means being preset to pass refrigerant to said second circuit heat exchanger means at a pressure in excess of the predetermined operating pressure in said first heat exchanger means to maintain the predetermined pressure in the latter.

References Cited in the file of this patent

UNITED STATES PATENTS

| | | |
|---|---|---|
| 2,581,744 | Zimmerman | Jan. 8, 1952 |
| 2,998,710 | Reese | Sept. 5, 1961 |
| 3,015,939 | Brainard | Jan. 9, 1962 |
| 3,060,698 | Felter | Oct. 30, 1962 |